| United States Patent [19] | [11] Patent Number: 4,582,613 |
|---|---|
| Kenney et al. | [45] Date of Patent: Apr. 15, 1986 |

[54] USE OF COPPER (II) OXIDE AS SOURCE OF OXYGEN FOR OXIDATION REACTIONS

[75] Inventors: Charlie W. Kenney, Littleton; Laura A. Uchida, Lakewood, both of Colo.

[73] Assignee: Resource Technology Associates, Boulder, Colo.

[21] Appl. No.: 653,344

[22] Filed: Sep. 24, 1984

[51] Int. Cl.$^4$ ............................................. C02F 1/72
[52] U.S. Cl. ................................... 210/761; 210/758; 210/904; 210/909; 423/42; 75/117
[58] Field of Search ............... 210/758, 761, 762, 763, 210/721, 909, 711, 904; 75/117; 423/42, 35, 604; 568/724

[56] References Cited

U.S. PATENT DOCUMENTS

| 1,925,367 | 9/1953 | Booth | 568/747 |
|---|---|---|---|
| 2,944,396 | 7/1960 | Barton et al. | 210/763 |
| 3,606,999 | 9/1971 | Lawless | 210/761 |
| 3,853,759 | 12/1974 | Titmas | 210/761 |
| 4,195,189 | 3/1980 | Earley | 568/730 |

FOREIGN PATENT DOCUMENTS

| 2534458 | 2/1976 | Fed. Rep. of Germany | 210/904 |
|---|---|---|---|
| 50-106862 | 8/1975 | Japan | 210/761 |
| 51-24575 | 2/1976 | Japan | 210/761 |
| 785202 | 12/1980 | U.S.S.R. | 210/763 |

*Primary Examiner*—Benoît Castel
*Attorney, Agent, or Firm*—Sheridan, Ross & McIntosh

[57] ABSTRACT

This invention comprises a wet oxidation process utilizing copper (II) oxide as the sole oxygen source. In particular the destruction and detoxification by oxidation of toxic materials such as cyanide, hydrocarbons, halogenated hydrocarbons, and dioxins contained in typically aqueous streams by using copper (II) oxide is contemplated. The preferred embodiment involves adding the copper (II) oxide to the feed stream containing the toxic materials and reacting the stream under elevated pressure and elevated temperature conditions to substantially oxidize the toxic materials to less toxic or innocuous compounds. The oxidation process can be accomplished in a vertical tube reactor system, wherein the necessary pressure for the wet oxidation is achieved by hydrostatic head pressure inherent in the system.

26 Claims, No Drawings

USE OF COPPER (II) OXIDE AS SOURCE OF OXYGEN FOR OXIDATION REACTIONS

FIELD OF INVENTION

This invention relates to the detoxification of toxic substances by oxidation utilizing copper (II) oxide as the single oxygen source for the oxidation reactions.

BACKGROUND OF THE INVENTION

Wet oxidation is a series of oxidative and hydrolysis reactions which occur at elevated temperatures and pressures, typically in an aqueous environment. Wet oxidation is a well-known process for use in purifying waste waters, such as sewage sludge and manufacturing waste process waters. Further, it is known that wet oxidation can be accomplished by use of a catalyst with an oxygen-containing gas at elevated temperatures and pressures. U.S. Pat. No. 4,141,828 to Okada et al., teaches a process of wet oxidation of ammonia-containing waste water by contacting the waste water with an oxygen-containing gas and a catalyst and subjecting the mixture to the elevated temperatures and pressures. U.S. Pat. No. 4,072,608 to Farha, Jr. et al., teaches a process for the purification of water polluted by organics and oxygen-containing compounds. This process comprises contacting the waste water and an oxygen-containing gas with an iron group metal promoted by a solid copper-magnesium-oxygen spinel structure catalyst at elevated temperatures and pressures. U.S. Pat. No. 4,062,772 to Box, Jr. et al. also relates to a process for the purification of organically polluted waters by contacting the waste waters with a solid copper-magnesium-oxygen catalyst promoted with bismuth and an oxygen-containing gas at elevated temperatures and pressures. U.S. Pat. No. 4,268,399 to Box, Jr. et al., relates to a process for oxidizing organically polluted waters by contacting the polluted waters with an oxygen-containing gas and a catalyst consisting of zinc, titanium, and oxygen.

None of these references teach a process of wet oxidation using copper (II) oxide (CuO) as the single oxygen source for the oxidizing reactions.

Accordingly, it is an object of this invention to provide a wet oxidation process, particularly for the detoxification of waste streams, utilizing copper (II) oxide as the single oxygen source for the reactions.

As a result of major environmental problems occurring today, inorganic and organic waste material that are generally carried in aqueous streams must be detoxified before disposal. Waste compounds that pose environmental disposal problems include cyanide-bearing solutions; halogenated hydrocarbons, such as pentachlorophenols prevalent in wood processing waste; hydrocarbon wastes from petrochemical plants and refineries, such as phenolic compounds; and dioxins. However, effective detoxification and destruction of the toxic waste materials require costly chemicals and/or elevated pressures which make such a system quite expensive.

The high pressures required for wet oxidation reactions have been previously achieved in autoclave-type reaction vessels which allow for agitation and mixing of the reaction components. However, such systems require large amounts of energy to achieve the required temperatures and pressures and to pump reaction components into the pressurized vessels. It was desirable to find a more economical way of achieving the required temperatures and pressures and moving reaction components. A vertical tube reactor configuration was considered as an economic means for achieving desired reaction conditions. U.S. Pat. No. 4,272,383 to McGrew, along with the various references cited therein, disclose such reactor configurations, along with particular processing conditions for treatment of particular wastes. Deep well reactors have been used to accomplish wet oxidation, and a vertical tube subsurface reactor environment useful for controlled chemical oxidation reactions was disclosed in U.S. Pat. No. 3,606,999 to Lawless, but this patent does not teach detoxification of hazardous waste. Use of a vertical tube reactor system could provide the necessary pressure by hydrostatic head pressure inherent in the system, but such reactors do not allow for agitation or mixing of the reaction components as they provide only "plug" or laminar flow. Since detoxification of many of the waste materials involves decomposition of molecules or complexes which are difficult to break, and thought to require agitation of the reaction mixture in order to achieve reasonably complete oxidation, the usefulness of a vertical tube reactor for this purpose was by no means certain. Surprisingly, however, the vertical tube reactor was found to be effective in achieving substantially complete detoxifying even on such stubborn materials as copper and silver complexes with cyanide. However, one disadvantage of the subsurface vertical tube reactor system is the introduction of an oxygen-containing gas at these depths. It would be advantageous to have a system where the oxygen source is contacted with the waste feed stream prior to downflowing the waste stream into the vertical tube reactor system.

Thus, an object of one embodiment of this invention is to provide an oxidation process for the detoxification of hazardous organic and inorganic waste contained in feed streams by using a vertical tube reactor system in which the only external oxygen source is non-gaseous copper (II) oxide.

SUMMARY OF THE INVENTION

This invention provides processes for the oxidation treatment of liquid feed streams containing toxic materials, such as cyanides, and including hydrocarbons such as phenols, halogenated hydrocarbons, such as pentachlorophenol, and dioxins. Such feed streams are typically, but not necessarily, aqueous. The feed stream containing the toxic material is mixed with copper (II) oxide and this mixture is subjected to conditions of elevated temperature and elevated pressures for a time sufficient such that the toxic materials are detoxified and destroyed by oxidation. The treated feed stream is substantially free of the toxic materials and is typically suitable after treatment for acceptable disposal. The only external source of oxygen is the copper (II) oxide, and no external additional source of oxygen is required. The copper (II) oxide provides the oxygen necessary for the oxidation reaction, with a concomitant reduction of the copper (II) oxide to copper (I) oxide or elemental copper.

In another embodiment of the invention, the process steps are conducted in a vertical tube reactor system, wherein the necessary pressure is achieved by hydrostatic head pressure inherent in the system.

In other embodiments, the reduced copper is recovered from the oxidized streams and regenerated and recycled as copper (II) oxide for use in the process steps of the invention.

DETAILED DESCRIPTION OF THE PREFERRED EMBODIMENTS

Typical feed material for the processes of the present invention are toxic organic and inorganic compounds capable of being destroyed or beneficially altered by oxidation, such as cyanides, including free cyanide, metal-cyanide complexes, thiocyanates, and thiosulfates; halogenated hydrocarbons, such as pentachlorophenol (PCP); petrochemical plants and refinery waste, such as phenolic compounds; and dioxins. The toxic organic and inorganic compounds used as feed material are chemically oxidizable substances that convert during the oxidation reaction to less toxic or innocuous products. By oxidation, as used herein, is meant a reaction in which oxygen reacts with the toxic material to form less toxic or innocuous compounds. When the toxic material is contained in an aqueous medium, hydrolysis reactions also take place. As used herein, materials defined as toxic and/or hazardous can include chemical compounds or groups of compounds that are generally regarded as having toxic properties, either when ingested, inhaled, or absorbed via the skin. Excluded from this list would be radioactive substances. For purposes of this invention innocuous or harmless means not toxic. The feed material is typically contained in an aqueous stream, usually a waste aqueous stream derived from a manufacturing or ore treatment process. Typical amounts of toxic material in the stream are from about 1 ppm to about 15 g/l, although streams containing more or less toxic materials may be treated according to the processes of this invention.

In the initial step, the toxic material-containing stream, typically aqueous, is mixed with a slurry of copper (II) oxide in water or other liquids. The amount of copper (II) oxide added to the waste stream depends upon the amount of toxic material to be oxidized. Typically this amount is the stoichiometric amount, or greater, of oxygen necessary to oxidize the toxic materials.

The copper (II) oxide-loaded stream is next contacted at elevated temperatures and elevated pressures and for a time sufficient to detoxify the toxic materials contained in the stream. The copper (II) oxide supplies the oxygen necessary for the reaction with a concomitant reduction of the copper (II) oxide to copper (I) oxide or elemental copper. After the heat and pressure treatment, the stream, particularly if aqueous, may be suitable for acceptable disposal without further treatment as the stream is substantially free of the toxic materials.

Phenol is a common constituent of petrochemical and refinery hydrocarbon wastes. When phenol is contained in an aqueous feed stream, the stoichiometric amount of copper (II) oxide supplied oxygen required to completely oxidize phenol is generally about 1.0 to about 1.5. The reaction occurs according to the following equation:

$$C_6H_5OH + 14CuO \rightarrow 6CO_2O + 3H_2 + 14\ Cu° \quad (i)$$

When a halogenated hydrocarbon is contained in the aqueous feed stream such as pentachlorophenol (PCP), the reaction of the wet oxidation of PCP is as follows:

$$C_6Cl_5OH + H_2O + 9CuO \rightarrow 6CO_2 + 5HCl + 9Cu° \quad (ii)$$

Dioxin compounds, such as 2,3,7,8-tetrachlorodibenzo-p-dioxin(2,3,7,8-TCDD) found in the discontinued herbicide 2,4,5-trichlorophenoxyacetic acid; 2-chlorodibenzo-dioxin (2-CDD); 1,2,3,4-tetrachlorodibenzo-dioxin (1,2,3,4-TCDD); and 2,7-dichloro-dibenzo-dioxin (2,7-DCDD) are also effectively detoxified.

In addition, cyanide-containing solutions may also be beneficially treated according to the processes of this invention to less toxic substances.

Although the process of this invention is described with respect to the above specific toxic substances, it is not limited thereto and may be advantageously used to oxidize all substances which may be beneficiated by conventional wet oxidation procedures.

Typically, the oxidation process is conducted at a temperature of from about 70° C. to about 370° C., more preferably from about 200° C. to about 350° C., and most preferably at a temperature of from about 290° C. to about 350° C. The pressures are typically in the range of from about 400psi to about 3200 psi, more preferably from about 1000 psi to about 2400 psi. As will be understood by those skilled in the art, the time may be adjusted based on considerations of process variables, such as the amount of CuO added, the percent of toxic materials present, and the temperatures and pressures chosen as operating conditions. Generally, at higher temperatures and pressures, less time is required for the process.

The pH of the feed streams will typically be from about 2 to about 12, dependent upon the type and concentration of feed material contained in the stream.

In the preferred embodiment, the copper (II) oxide, which has been reduced to copper (I) oxide or elemental copper from the oxidation process, is recovered and separated from the oxidized stream. The reduced copper can be treated by means known in the art to regenerate copper (II) oxide, which is then suitable for recycling to the steps of this process.

The process of the invention requires a reactor or other apparatus into which the cupric oxide is added and in which the stream is heated and pressurized. A number of reaction pressure apparatuses known in the art may be used, as for example: a stirred pressure vessel, a pipeline reactor, or a free-flowing pressurized absorption column.

In one embodiment of the invention, the process steps are carried out in a vertical tube reactor system, wherein the necessary pressure is achieved by hydrostatic head pressure inherent in the system. The reactor design is typically vertical, with a downcomer portion which is generally a cylindrical pipe, and a riser portion which is also generally a cylindrical pipe. Another configuration for a vertical reactor system is a U-tube wherein one leg comprises the downcomer and the adjacent leg comprises the riser. Another configuration is an annular tubing arrangement wherein the downcomer generally comprises an internal cylindrical pipe and the riser comprises a concentric outside annular ring. Suitably lined deep bore holes or well holes can be utilized as the process apparatus and the desired pressure can be achieved by conducting the reaction at a pre-selected underground depth. It is not necessary that the reactor configuration be truly vertical, as long as the feed material is introduced into the reactor system at a location sufficiently elevated from the primary reactor zone portion of the system so as to generate sufficient hydrostatic head pressure. Utilizing the inherent hydrostatic head pressure of the system significantly reduces the cost of the operations, making the process more economically feasible.

The dimensions of the downcomer and riser portions of the reactor system are designed so that the feed stream flow rate and reactor residence time are sufficient to accomplish the oxidative reaction. The reactor length is primarily a function of the desired reaction pressure.

Upon exiting the riser portion of the reactor system, the reduced copper exists in precipitated form in the oxidized aqueous stream. The process aqueous stream is preferably separated from the copper, and the copper may then be treated to regenerate copper (II) oxide for recycle to the process.

The following examples are provided by way of illustration and not by way of limitation.

EXAMPLE 1

Tests were run on phenol, $C_6H_5OH$, a water soluble organic, using CuO as a solid oxygen donor. All tests were run in a 300-ml stainless steel Parr stirred autoclave. To start a test, the phenol and deionized water and copper (II) oxide were placed in the autoclave and the system was purged with nitrogen. The autoclave was heated to the required temperature. The temperature was maintained for the allotted time and the autoclave was cooled by removing the heating mantle and, in some cases, by using an air blower or water bath. When the system reached room temperature, a gas sample was analyzed by either gas chromatography or Orsat (gas absorption). After gas samples were taken, the slurry was filtered and the filtrate analyses included pH, phenol, total organic carbon (TOC), chemical oxygen demand (COD), and copper.

Table 1 contains a summary of test conditions and results. Reduction of phenol, TOC, and COD were primarily functions of reaction temperature. The maximum phenol removal with cupric oxide was achieved at a temperature of about 338° C. An insufficient quantity of gas was available at the end of the runs with cupric oxide for an analysis of organic vapors.

TABLE 1

Wet Oxidation of Phenol
Summary of Test Conditions and Results

| Test No. | Feed | 1 | 2 | 3 | 4 |
|---|---|---|---|---|---|
| Input | | | | | |
| Sample(1*) | 0.74 g phenol | 0.74 g phenol | 0.76 g phenol | 0.74 g phenol | 0.87 g phenol |
| | CuO | 11.34 g CuO | 11.35 g CuO | 11.34 g CuO | 11.34 g CuO |
| Excess $O_2$, no. times stoic for $C_6H_5OH$ | | 1.30 | 1.26 | 1.30 | 1.10 |
| Test Conditions | | | | | |
| Preheat, min | — | 145 | 58 | 54 | 87 |
| Temp, °C. | — | 316–320 | 242–248 | 279–280 | 337–340 |
| Pressure, psig | — | 1550–1610 | 500–540 | 875–910 | 2050–2125 |
| Residence time, min | — | 44 | 80 | 70 | 78 |
| Products | | | | | |
| Gas | | | | | |
| Volume, ml | — | 261 | 211 | 211 | 211 |
| Pressure, psig | — | 11.22 | 0.39 | 0.19 | 23 |
| % $CO_2$(*3) | — | 6.8 | (*4) | (*4) | 40 |
| % $O_2$(*3) | — | 3.4 | (*4) | (*4) | 6.0 |
| Liquor (rinse) | | | | | |
| Volume, ml | — | 77(320) | 94(375) | 88(320) | 67(540) |
| pH | 4.6 | 4.95 | 5.2 | 4.4 | 4.6 |
| Phenol, mg/l | 6720 | 2660(60.9) | 4090(62.5) | 3590(89.1) | 712(22.4) |
| TOC, mg/l | 5560 | 2440(69) | 3660(119) | 3230(90) | 845(36) |
| COD, mg/l | 17,200 | 7400(171) | 11,060(276) | 9730(267) | 1940(80) |
| Cu, mg/l | 0.02 | 50.1(1.91) | 1.42(0.28) | 2.55(0.30) | 43.5(3.00) |
| % reduction of phenol(*2) | — | 66.6 | 40.9 | 48.7 | 92.4 |
| % reduction in TOC(*5) | — | 62.2 | 31.9 | 43.7 | 88.4 |
| % reduction in COD(*6) | — | 63.7 | 35.3 | 45.3 | 91.4 |

(*1)Dissolved in 100 ml deionized water.
(*2)Assume 9.29% degradation of initial sample and no phenol in gas phase.
(*3)Orsat Analysis.
(*4)Insufficient sample for analysis.
(*5)Assume initial TOC = 75.1% of initial sample phenol concentration.
(*6)Assume initial COD = 2.324 × initial sample phenol concentration.

EXAMPLE 2

Pentachlorophenol (PCP) Tests

Tests were completed to determine the effects of temperature, time, pH, and the use of a solid oxygen carrier on PCP destruction. The tests were run in a 600-ml stainless steel autoclave equipped with a glass liner and titanium or Hastelloy C wetted parts. A solution containing 1 gram per liter of PCP was used as feed for the tests. In Test 1, the solution was heated with mixing under a nitrogen atmosphere to the desired reaction conditions; then 100 psi of oxygen was added. In Test 2, the oxygen gas was not added, instead, CuO, the solid oxygen carrier, was added to the solution. To end the tests, the reactor was cooled rapidly by removing the heat source and running water through a cooling loop. The aqueous solution was removed and the reactor was rinsed with methanol to recover residual PCP. Both the aqueous and alcohol solutions were analyzed for PCP using a gas chromatograph/mass spectrometer.

Test conditions and results are summarized in Table 2.

TABLE 2

Summary of PCP Test Results

| Test No. | Temp °C. | Time min | PCP Removal(*1) % | Comments |
|---|---|---|---|---|
| 1 | 310 | 60 | 92.9 | |
| 2 | 310 | 60 | 97.2 | CuO oxygen carrier |

(*1)Removal based on PCP recovered in methanol wash solution.

Although the foregoing has been described in some detail by way of illustration and example for purposes of clarity of understanding, it will be obvious that certain changes and modifications may be practiced within the scope of the invention, as limited only by the scope of the appended claims.

What is claimed is:

1. A process for treating a liquid feed stream containing toxic materials said process comprising contacting said stream with copper (II) oxide as the only external source of oxygen at a temperature of from about 70° C. to about 370° C. and a pressure of from about 400 psi to about 3200 psi and for a time sufficient to substantially destructively oxidize and detoxify said materials.

2. A process according to claim 1 wherein said toxic materials are cyanides.

3. A process according to claim 1 wherein said toxic materials are hydrocarbons.

4. A process according to claim 3 wherein said toxic materials are phenolic compounds.

5. A process according to claim 3 wherein said toxic materials are halogenated hydrocarbons.

6. A process according to claim 5 wherein said halogenated hydrocarbon is pentachlorophenol.

7. A process according to claim 3 wherein said toxic materials are dioxins.

8. A process according to claim 1 wherein said feed stream is aqueous.

9. A process according to claim 1 wherein said feed stream is non-aqueous.

10. A process according to claim 1 wherein said CuO is in at least a stoichiometric amount necessary to oxidize the materials.

11. A process according to claim 1 wherein said temperature is from to about 290° C. to about 350° C.

12. A process according to claim 1 wherein said pressure is from about 1000 psi to about 2400 psi.

13. A process according to claim 1 further comprising regenerating copper reduced in the process to copper (II) oxide and recycling said copper (II) oxide.

14. A process for treating a liquid feed stream containing toxic materials comprising:
   (a) contacting said feed stream with copper (II) oxide as the only external source of oxygen; and
   (b) flowing said copper (II) oxide-loaded stream into the downcomer portion of a vertical tube reactor system at a temperature of from about 70° C. to about 370° C. and a pressure of from about 400 psi to about 3200 psi, wherein said pressure is produced by the hydrostatic head pressure inherent from the downflowing mixture and for a time sufficient to substantially detoxify said toxic materials such that said feed stream is substantially free of said toxic materials.

15. A process according to claim 14 wherein said toxic materials are cyanides.

16. A process according to claim 14 wherein said toxic materials are hydrocarbons.

17. A process according to claim 14 wherein said toxic materials are halogenated hydrocarbons.

18. A process according to claim 17 wherein said hydorcarbon is pentachlorophenol.

19. A process according to claim 14 wherein said toxic materials are phenolic compounds.

20. A process according to claim 14 wherein said toxic materials are dioxins.

21. A process according to claim 14 wherein said feed stream is aqueous.

22. A process according to claim 14 wherein said feed stream is non-aqueous.

23. A process according to claim 15 wherein said copper (II) oxide is in at least a stoichiometric amount necessary to oxidize said toxic materials.

24. A process according to claim 14 wherein said temperature is from about 290° C. to about 350° C.

25. A process according to claim 14 wherein said pressure is from 1000 psi to about 2400 psi.

26. A process according to claim 14 further comprising regenerating copper reduced in the process to copper (II) oxide and recycling said copper (II) oxide.

* * * * *

UNITED STATES PATENT AND TRADEMARK OFFICE
CERTIFICATE OF CORRECTION

PATENT NO. : 4,582,613
DATED : April 15, 1986
INVENTOR(S) : Kenney et al.

It is certified that error appears in the above—identified patent and that said Letters Patent is hereby corrected as shown below:

At Column 3, formula (i), line 61, that portion of the formula reading "$6CO_2O + 3H_2$" should read -- $6CO_2 + 3H_2O$ --.

At Column 7, Claim 11, line 36, the word "to" after the word "from" should be deleted.

At Column 8, Claim 18, line 22, the word "hydorcarbon" should read -- halogenated hydrocarbon --.

Signed and Sealed this

Fourteenth Day of October, 1986

[SEAL]

*Attest:*

DONALD J. QUIGG

*Attesting Officer*   *Commissioner of Patents and Trademarks*